United States Patent
Montojo et al.

(10) Patent No.: US 8,989,174 B2
(45) Date of Patent: Mar. 24, 2015

(54) MBSFN SUBFRAME GENERATION AND PROCESSING FOR UNICAST

(75) Inventors: Juan Montojo, San Diego, CA (US);
Peter Gaal, San Diego, CA (US);
Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 12/898,458

(22) Filed: Oct. 5, 2010

(65) Prior Publication Data

US 2011/0103286 A1    May 5, 2011

Related U.S. Application Data

(60) Provisional application No. 61/249,127, filed on Oct. 6, 2009.

(51) Int. Cl.
*H04W 48/08* (2009.01)
*H04W 24/10* (2009.01)
*H04W 88/06* (2009.01)

(52) U.S. Cl.
CPC .............. *H04W 48/08* (2013.01); *H04W 24/10* (2013.01); *H04W 88/06* (2013.01)
USPC ........... 370/350; 370/312; 370/313; 370/328; 370/329; 370/336

(58) Field of Classification Search
USPC .......... 370/312, 313, 328, 329, 330, 336, 350
See application file for complete search history.

(56) References Cited

U.S. PATENT DOCUMENTS

| | | | |
|---|---|---|---|
| 2009/0196165 A1 | 8/2009 | Morimoto et al. | |
| 2009/0238064 A1* | 9/2009 | Lee et al. | 370/208 |
| 2009/0279480 A1* | 11/2009 | Rosenqvist et al. | 370/328 |
| 2010/0009687 A1* | 1/2010 | Koivisto et al. | 455/450 |
| 2010/0039970 A1* | 2/2010 | Papasakellariou et al. | 370/310 |
| 2010/0110964 A1* | 5/2010 | Love et al. | 370/312 |
| 2010/0329171 A1* | 12/2010 | Kuo et al. | 370/312 |
| 2011/0013554 A1* | 1/2011 | Koskinen | 370/315 |
| 2011/0013574 A1* | 1/2011 | Hsu | 370/329 |

FOREIGN PATENT DOCUMENTS

| | | |
|---|---|---|
| CN | 101534285 A | 9/2009 |
| JP | 2007300503 A | 11/2007 |
| WO | WO2008100209 A1 | 8/2008 |

(Continued)

OTHER PUBLICATIONS

International Search Report and Written Opinion—PCT/US2010/051700—International Search Authority, European Patent Office,Feb. 4, 2011.

(Continued)

*Primary Examiner* — Dang Ton
*Assistant Examiner* — Robert M Morlan
(74) *Attorney, Agent, or Firm* — John J. Ketchum

(57) ABSTRACT

Certain aspects of the present disclosure propose methods and apparatus for utilizing unused Multimedia Broadcast over a Single Frequency Network (MBSFN) subframes for unicast transmissions. The proposed methods include efficient cyclic prefix (CP) and MBSFN frame structure design, and an optimized subframe/carrier bundling window design for hybrid automatic repeat request (HARQ) feedback in presence of the MBSFN subframes.

40 Claims, 9 Drawing Sheets

(56) References Cited

FOREIGN PATENT DOCUMENTS

| WO | WO2009110821 A1 | 9/2009 |
| WO | WO2009120791 A2 | 10/2009 |

OTHER PUBLICATIONS

Ericsson, MBMS RS, some remaining issues, TSG-RAN WG1 #51 R1-074834, Nov. 5, 2007.
NEC Group, Some issues related to MBSFN sub-frame structure, RAN WG1 meeting 48 bis R1-071821, Mar. 26, 2007.
Taiwan Search Report—TW099134087—TIPO—Jun. 4, 2013.
ZTE, Reuse the unscheduled MBSFN sub frame, 3GPP TSG RAN WG2 #67 R2-094782, Aug. 24, 2009.
3rd Generation Partnership Project, Technical Specification Group Radio Access Network, Evolved Universal Terrestrial Radio Access (E-UTRA), Physical Channels and Modulation (Release 8), 3GPP Standard, 3GPP TS 36.211, 3rd Generation Partnership Project (3GPP), Mobile Competence Centre, 650, Route des Lucioles, F-06921 Sophia-Antipolis Cedex, France, No. V8.7.0, May 1, 2009, pp. 1-83, XP050377539.

* cited by examiner

MBSFN SUBFRAME GENERATION AND PROCESSING FOR UNICAST

CLAIM OF PRIORITY UNDER 35 U.S.C. §119

The present Application for Patent claims benefit of U.S. Provisional Patent Application Ser. No. 61/249,127, entitled, "MBSFN Subframe Generation and Processing for Unicast" filed Oct. 6, 2009, and assigned to the assignee hereof and hereby expressly incorporated by reference herein.

TECHNICAL FIELD

The following description relates generally to wireless communications systems, and more particularly to efficient usage of Multimedia Broadcast/Multicast Services over Single Frequency Network (MBSFN) subframes for unicast transmissions.

BACKGROUND

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, Third Generation Partnership Project (3GPP) Long Term Evolution (LTE) systems including Evolved Universal Terrestrial Radio Access (E-UTRA) and orthogonal frequency division multiple access (OFDMA) systems.

An orthogonal frequency division multiplex (OFDM) communication system effectively partitions the overall system bandwidth into multiple subcarriers, which may also be referred to as frequency sub-channels, tones, or frequency bins. For an OFDM system, the data to be transmitted (e.g., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK (Phase Shift Keying) or M-QAM (Quadrature Amplitude Modulation) in which M may be a power of two) used for data transmission. At each time interval that may be dependent on the bandwidth of each frequency subcarrier, a modulation symbol may be transmitted on each of the frequency subcarriers. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-input-single-output, multiple-input-single-output or a multiple-input-multiple-output (MIMO) system.

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S <= \min \{N_T, N_R\}$. The $N_S$ spatial streams may be used to transmit $N_S$ independent data streams to achieve greater overall throughput.

A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point (AP) to extract transmit beam-forming gain on the forward link when multiple antennas are available at the AP. In a FDD system, the forward and reverse link transmissions are on different frequency regions. Therefore, forward link and reverse link channels may be estimated explicitly.

Multimedia Broadcast/Multicast Services (MBMS) provide simultaneous delivery of multimedia content to a large set of receivers. The MBMS can be split into three general areas-bearer services, delivery methods, and user services and applications. An MBMS bearer service provides a bit pipe for the transport of Internet protocol (IP) traffic to a group of receivers in an efficient manner. Two delivery methods may be defined in MBMS, such as streaming and file downloading. The streaming delivery method defines the protocols for the delivery of multimedia content for immediate consumption such as in a Mobile television channel. The file download delivery method enables a file streaming of multimedia files for storage and delayed consumption at the receiver. An MBMS user service is able to employ different delivery methods, unicast connections and MBMS bearer services for providing the desired application to a user.

SUMMARY

Certain aspects of the present disclosure provide a method for wireless communications. The method generally includes configuring one or more subframes as Multimedia Broadcast/Multicast Services over a Single Frequency Network (MBSFN) subframes and one or more subframes as non-MBSFN subframes, generating a unicast message to be transmitted in at least one of the MBSFN subframes, determining a pattern for one or more reference signals (RSs) to be transmitted in the at least one MBSFN subframe with the unicast message, the pattern determined based on a pattern for other one or more RSs to be transmitted in non-MBSFN subframes, and transmitting the at least one MBSFN subframe containing the unicast message with the RSs according to the determined pattern in the at least one MBSFN subframe.

Certain aspects of the present disclosure provide a method for wireless communications. The method generally includes receiving a unicast message in at least one subframe configured as a Multimedia Broadcast/Multicast Services over a Single Frequency Network (MBSFN) subframe, and measuring one or more reference signals (RSs) received with the unicast message in the MBSFN subframe, the RSs received in a pattern determined based on a pattern for RSs received in non-MBSFN subframes.

Certain aspects of the present disclosure provide an apparatus for wireless communications. The apparatus generally includes means for configuring one or more subframes as Multimedia Broadcast/Multicast Services over a Single Frequency Network (MBSFN) subframes and one or more subframes as non-MBSFN subframes, means for generating a unicast message to be transmitted in at least one of the MBSFN subframes, means for determining a pattern for one or more reference signals (RSs) to be transmitted in the at least one MBSFN subframe with the unicast message, the pattern determined based on a pattern for other one or more RSs to be transmitted in non-MBSFN subframes, and means for transmitting the at least one MBSFN subframe containing the unicast message with the RSs according to the determined pattern in the at least one MBSFN subframe.

Certain aspects of the present disclosure provide an apparatus for wireless communications. The apparatus generally includes means for receiving a unicast message in at least one subframe configured as a Multimedia Broadcast/Multicast Services over a Single Frequency Network (MBSFN) subframe, and means for measuring one or more reference signals (RSs) received with the unicast message in the MBSFN subframe, the RSs received in a pattern determined based on a pattern for RSs received in non-MBSFN subframes.

Certain aspects of the present disclosure provide an apparatus for wireless communications. The apparatus generally includes at least one processor configured to configure one or more subframes as Multimedia Broadcast/Multicast Services over a Single Frequency Network (MBSFN) subframes and one or more subframes as non-MBSFN subframes, generate a unicast message to be transmitted in at least one of the MBSFN subframes, determine a pattern for one or more reference signals (RSs) to be transmitted in the at least one MBSFN subframe with the unicast message, the pattern determined based on a pattern for other one or more RSs to be transmitted in non-MBSFN subframes, and transmit the at least one MBSFN subframe containing the unicast message with the RSs according to the determined pattern in the at least one MBSFN subframe, and a memory coupled to the at least one processor.

Certain aspects of the present disclosure provide an apparatus for wireless communications. The apparatus generally includes at least one processor configured to receive a unicast message in at least one subframe configured as a Multimedia Broadcast/Multicast Services over a Single Frequency Network (MBSFN) subframe, and measure one or more reference signals (RSs) received with the unicast message in the MBSFN subframe, the RSs received in a pattern determined based on a pattern for RSs received in non-MBSFN subframes, and a memory coupled to the at least one processor.

Certain aspects of the present disclosure provide a computer-program product for wireless communication comprising a computer readable medium having instructions stored thereon, the instructions being executable by one or more processors. The instructions generally include instructions for configuring one or more subframes as Multimedia Broadcast/Multicast Services over a Single Frequency Network (MBSFN) subframes and one or more subframes as non-MBSFN subframes, generating a unicast message to be transmitted in at least one of the MBSFN subframes, determining a pattern for one or more reference signals (RSs) to be transmitted in the at least one MBSFN subframe with the unicast message, the pattern determined based on a pattern for other one or more RSs to be transmitted in non-MBSFN subframes, and transmitting the at least one MBSFN subframe containing the unicast message with the RSs according to the determined pattern in the at least one MBSFN subframe.

Certain aspects of the present disclosure provide a computer-program product for wireless communication comprising a computer readable medium having instructions stored thereon, the instructions being executable by one or more processors. The instructions generally include instructions for receiving a unicast message in at least one subframe configured as a Multimedia Broadcast/Multicast Services over a Single Frequency Network (MBSFN) subframe, and measuring one or more reference signals (RSs) received with the unicast message in the MBSFN subframe, the RSs received in a pattern determined based on a pattern for RSs received in non-MBSFN subframes.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
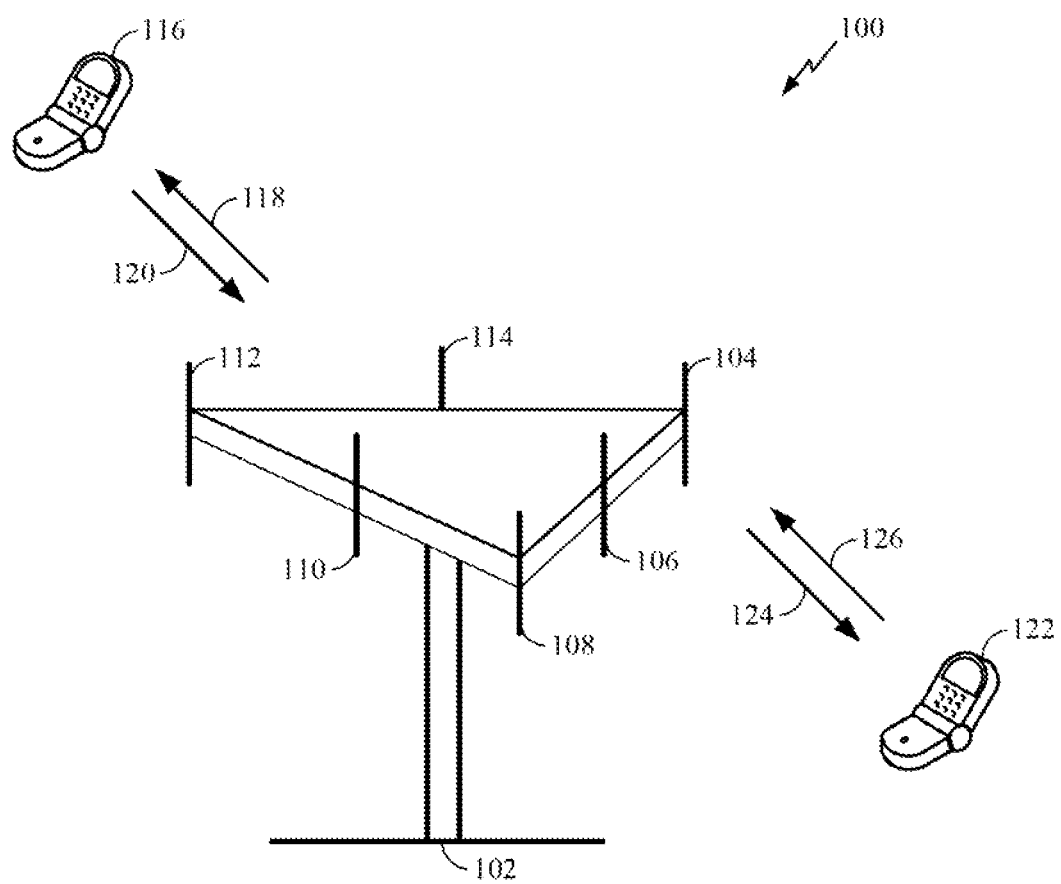
FIG. 1 illustrates a multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an evolved Node B (eNode B) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and time division synchronous code division multiple access (TD-SCDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. It should be noted that LTE terminology is used for illustration and does not limit scope of this disclosure.

Single carrier frequency division multiple access (SC-FDMA), which utilizes single carrier modulation and frequency domain equalization, has similar performance and essentially the same overall complexity as those of an OFDMA system. SC-FDMA signal may have lower peak-to-average power ratio (PAPR) because of its inherent single carrier structure. SC-FDMA may be utilized in uplink communications where lower PAPR benefits the mobile terminal in terms of transmit power efficiency.

Referring to FIG. 1, a multiple access wireless communication system 100 according to one aspect is illustrated. An access point 102 (AP) includes multiple antenna groups, one including 104 and 106, another including 108 and 110, and an additional one including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may each use a different frequency for communication. For example, forward link 120 may use a different frequency than that used by reverse link 118.

Each group of antennas and/or the area in which they are designed to communicate is often referred to as a sector of the access point. In the aspect, antenna groups each are designed to communicate to access terminals in a sector, of the areas covered by access point 102.

In communication over forward links 120 and 126, the transmitting antennas of access point 102 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a base station, Node B, eNode B or some other terminology. An access terminal may also be called a user terminal, user equipment (UE), a wireless communication device, terminal or some other terminology.

Figure 2:
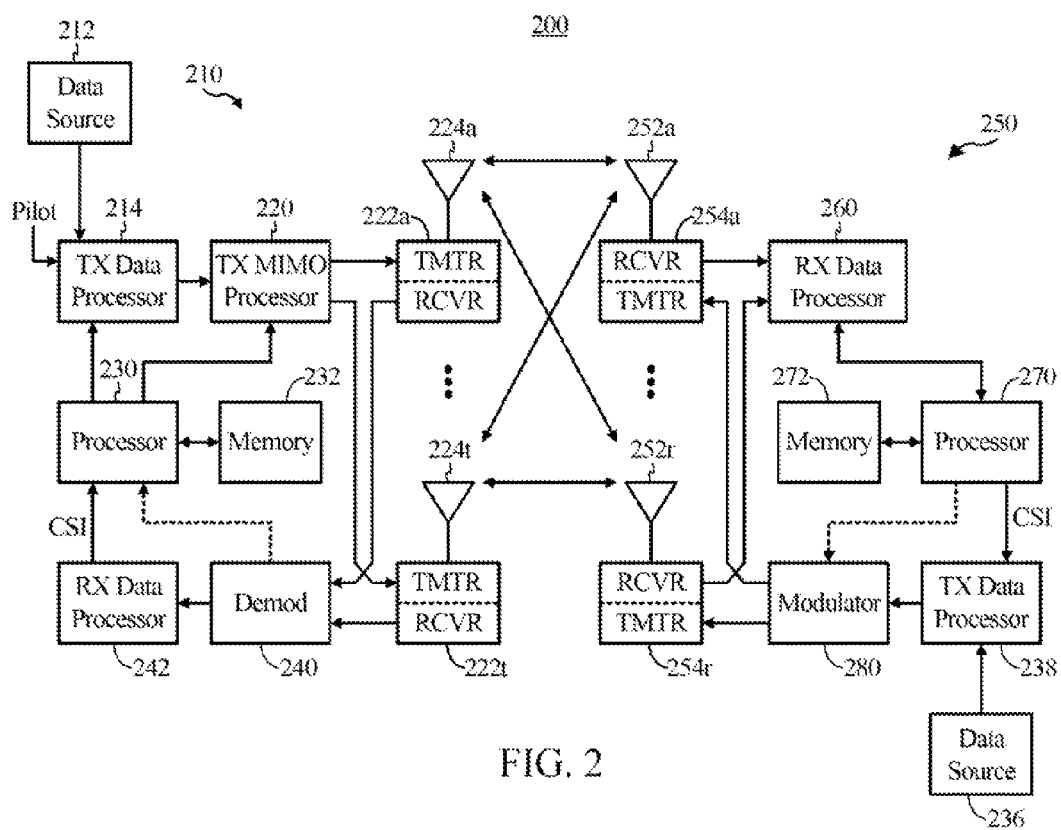
FIG. 2 illustrates a block diagram of a communication system, in accordance with certain aspects of the present disclosure.

FIG. 2 is a block diagram of an aspect of a transmitter system 210 and a receiver system 250 in a MIMO system 200. The transmitter and the receiver system may reside in an access point or an access terminal. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation)) selected for that data stream to provide modulation symbols. The data rate, coding, and modulation for each data stream may be determined by instructions performed by processor 230 utilizing information about the communication link between the transmitter system and the receiver system, such as channel state information (CSI). A memory 232 may be coupled to the processor 230 that may store system configuration parameters or previous values of one or more calculated parameters.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

Processor 270, coupled with the memory 272, formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
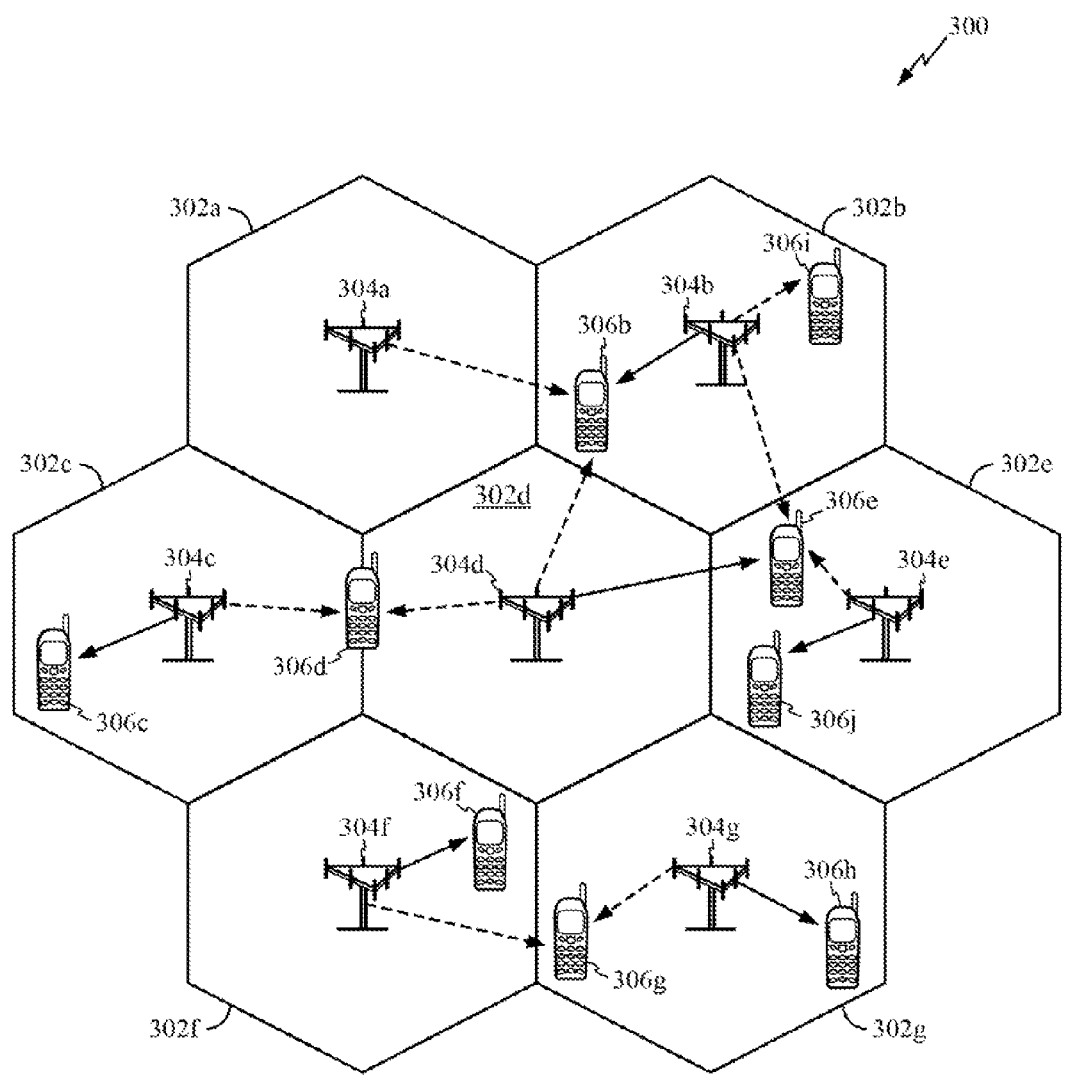
FIG. 3 illustrates an example wireless communication system, in accordance with certain aspects of the present disclosure.

FIG. 3 illustrates an example wireless communication system 300 configured to support a number of users, in which various disclosed aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g., to serve one or more frequencies). Various access terminals (ATs) 306, including ATs 306b-306j, also known interchangeably as user equipment (UE) or mobile stations, are dispersed throughout the system. Each UE 306 may communicate with one or more APs 304 on a forward link (FL) and/or a reverse link (RL) at a given moment, depending upon whether the UE is active and whether it is in soft handoff, for example. The wireless communication system 300 may provide service over a large geographic region, while macro cells 302a-302g may cover a smaller geographic region.

Certain aspects of the present disclosure propose methods and apparatus for utilizing unused Multimedia Broadcast over a Single Frequency Network (MBSFN) subframes for unicast transmissions. The proposed methods include efficient cyclic prefix (CP) and MBSFN frame structure design, and an optimized subframe/carrier bundling window design for hybrid automatic repeat request (HARQ) feedback in the presence of MBSFN subframes.

For certain aspects, unused MBSFN subframes in a frame may be used for unicast transmission. The MBSFN subframes may be the subframes that are configured by a system information broadcast (e.g., the System Information Block Type 2 (SIB2)) to carry information regarding Multimedia Broadcast and Multicast Services (MBMS), as well as other services, such as positioning, relay backhaul, and so on.

Since the MBSFN subframes may be configured by the SIB2 message, their configuration may be semi-static. Typically, the configuration may change every few hours. However, some MBMS subframes reserved for MBSFN services may remain unused because of rate variations in a serving MBMS or other reasons. For certain aspects, the reserved but unused MBSFN subframes may be utilized for transmission of unicast services.

Subframes not configured via SIB2 as MBSFN subframes (e.g., unicast subframes) may either have a normal or an extended cyclic prefix (CP). However, the entire subframe including both control and data regions may use a single type of CP. Cyclic prefix refers to the addition of a copy of a portion of a symbol to the beginning of the symbol. Cyclic prefix may be used to reduce or eliminate intersymbol interference.

In an MBSFN subframe, the first two symbols may be used for control. These control symbols (also called non-MBSFN symbols) may assume a CP similar to the CP used for the subframe number zero. The subframe number zero may only be used for unicast transmissions which may utilize either normal or extended CP. The remaining OFDM symbols in the MBSFN subframe which may be used for MBSFN-related services, may utilize extended CP. Therefore, the control region of the MBSFN subframe may accept normal or extended CP following subframe number zero. However, data region may only accept extended CP.

If a subframe uses a mixed CP (e.g., normal CP for control and extended CP for data), the starting position for the symbols with extended cyclic prefix may be identical to those in a time slot where all symbols use extended cyclic prefix. Thus, there may be a part of the time slot between the two cyclic prefix regions where the transmitted signal is not specified, which may remain unused. The unused part of the time slot in the mixed CP case may result in an inefficient system. In addition, for unicast traffic, operation with the normal CP may be more efficient than the operation with the extended CP, as the extra CP duration in the extended CP may be unnecessary for the unicast traffic.

For certain aspects, if an MBSFN subframe is used for unicast transmissions, the data region may utilize a CP similar to the CP in the control region to eliminate the unused time in the MBSFN subframe. This may result in a more efficient operation utilizing normal CP. In other words, a CP similar to the CP of the subframe number zero may be applied to an entire MBSFN subframe if that subframe is used for unicast.

Figure 4:
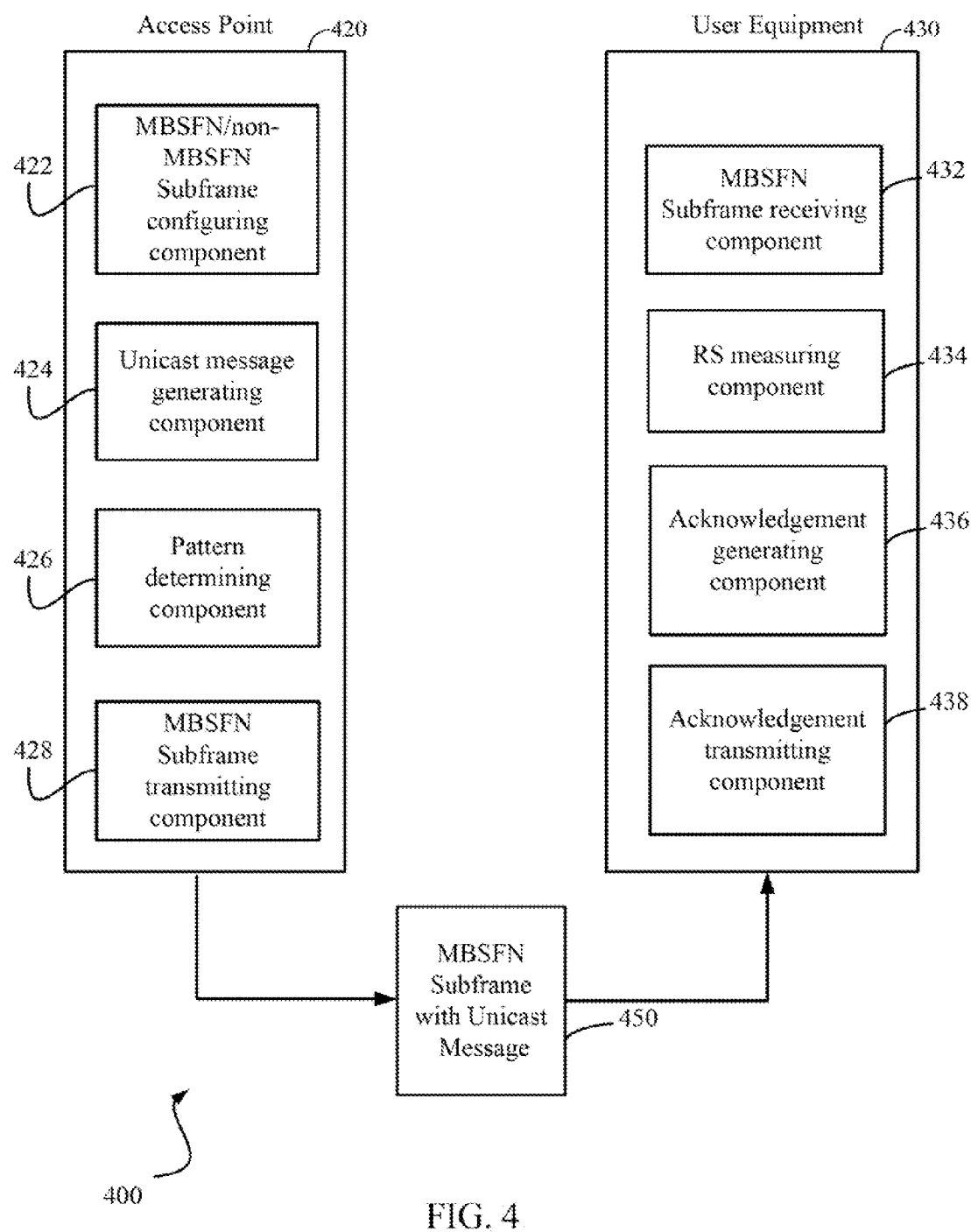
FIG. 4 illustrates a wireless network that employs Multimedia Broadcast/Multicast Services (MBMS) over a Single Frequency Network (MBSFN).

FIG. 4 illustrates a wireless network 400 that may employ MBSFN. The system 400 includes one or more access points 420 which can be an entity capable of communication over the wireless network to one or more user equipments 430. According to certain aspects, the access point may utilize unused MBSFN subframes for transmission of unicast messages. The access point 420 may include an MBSFN/non-MBSFN subframe configuring component 422, a unicast message generating component 424, a pattern determining component 426 and an MBSFN subframe transmitting component 428.

The MBSFN subframe configuring component 422 may configure one or more subframes for MBSFN services and one or more subframes for non-MBSFN services. The unicast message generating component 424 may generate a unicast message to be transmitted in at least one of the MBSFN subframes that are configured by the MBSFN subframe configuring component 422. The pattern determining component 426 may determine a pattern for one or more reference signals (RSs) to be transmitted in the at least one MBSFN subframe with the unicast message generated by the MBSFN subframe configuring component 422. The pattern may be determined based on a pattern for other one or more RSs to be transmitted in non-MBSFN subframes. For example, the pattern may be common reference signal or a UE-specific reference signal pattern depending on the transmission mode of the signal. The MBSFN subframe transmitting component 428 may transmit the generated MBSFN subframe 450 that carries the unicast message with the RSs according to the determined pattern.

The UE 430 may receive the MBSFN subframe with an MBSFN subframe receiving component 432. The RS measuring component 434 may be configured to measure one or more RSs received with the unicast message in the MBSFN subframe. As described above, the RSs may be received in a pattern determined based on a pattern for RSs received in non-MBSFN subframes. If the unicast message is received correctly, the UE may then send an acknowledgement message to the AP. The UE may generate an acknowledgement using an acknowledgement generating component 436. The UE may transmit the generated acknowledgement message to the AP using acknowledgement transmitting component 438.

Figure 5:
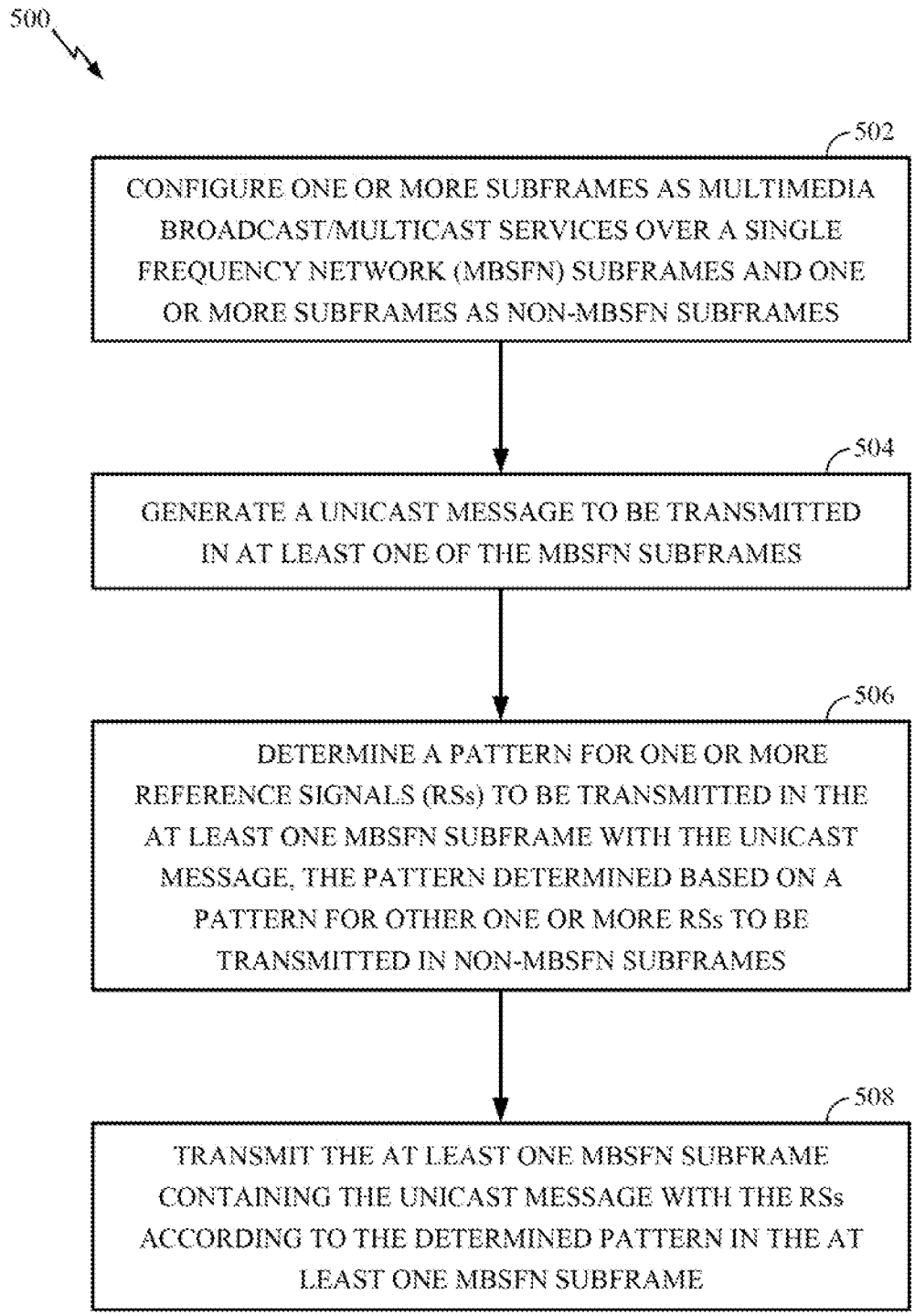
FIG. 5 illustrates example operations that may be performed by an access point for reusing MBSFN subframes for unicast transmission, in accordance with certain aspects of the present disclosure.

FIG. 5 illustrates example operations 500 that may be performed by an access point for reusing MBSFN subframes for unicast transmission, in accordance with certain aspects of the present disclosure. At 502, an access point configures one or more subframes of a frame as MBSFN subframes and one or more subframes as non-MBSFN subframes. At 504, the access point generates a unicast message to be transmitted in at least one of the MBSFN subframes. As an example, the AP may decide to use an MBSFN subframe to transmit a unicast message when a certain number of the MBSFN subframes remain unused because of rate variations in a serving MBMS. For example, the AP may count number of unused MBSFN subframes. If the number of unused MBSFN subframes is equal to or higher than a threshold, the AP may start using the unused MBSFN subframes for unicast transmission.

At 506, the access point determines a pattern for one or more reference signals (RSs) to be transmitted in the at least one MBSFN subframe with the unicast message, the pattern determined based on a pattern for other one or more RSs to be transmitted in non-MBSFN subframes. For certain aspects, the pattern may be determined based on a physical downlink shared channel (PDSCH) transmission scheme. For example, the pattern may be a common reference signal (CRS) pattern for a CRS-based PDSCH transmission scheme. As another example, the pattern may be a reference signal pattern specific to a user equipment in a UE-RS based PDSCH transmission scheme.

At 508, the access point transmits the at least one MBSFN subframe containing the unicast message with the RSs according to the determined pattern in the at least one MBSFN subframe. UEs may use the received information according to the steps that are described in FIG. 6.

For certain aspects, the AP may signal one or more UEs with information indicative of a number of MBSFN subframes that are used for unicast transmissions. For certain aspects, if a unicast subframe is larger than an MBSFN subframe, the unicast subframe may be transmitted using two or more MBSFN subframes. Similarly, if a unicast subframe is smaller than a MBSFN subframe, two or more unicast subframes may be transmitted in a MBSFN subframe.

Figure 6:
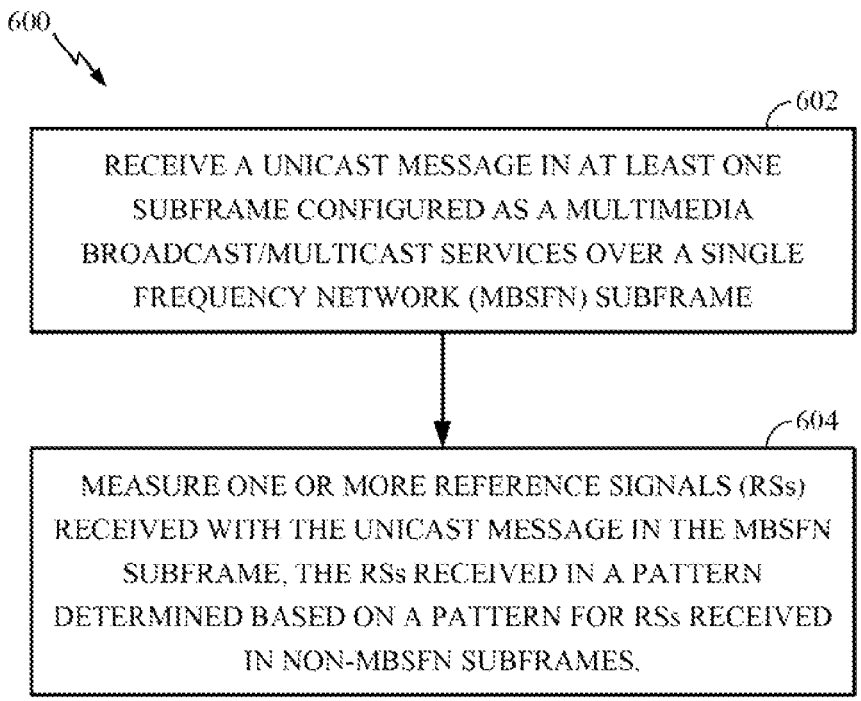
FIG. 6 illustrates, example operations that may be performed by a user equipment for reusing MBSFN subframes for unicast transmission, in accordance with certain aspects of the present disclosure.

FIG. 6 illustrates example operations 600 that may be performed by a user equipment for reusing unused MBSFN subframes for unicast transmission, in accordance with certain aspects of the present disclosure. At 602, the UE receives a unicast message in at least one subframe configured as a MBSFN subframe. At 604, the UE measures one or more RSs received with the unicast message in the MBSFN subframe, the RSs received in a pattern determined based on a pattern for RSs received in non-MBSFN subframes. For example, the UE may use the measurements to determine if the MBSFN subframe is carrying a unicast message or not. The UE may then process the information received in the unicast message.

Figure 7:
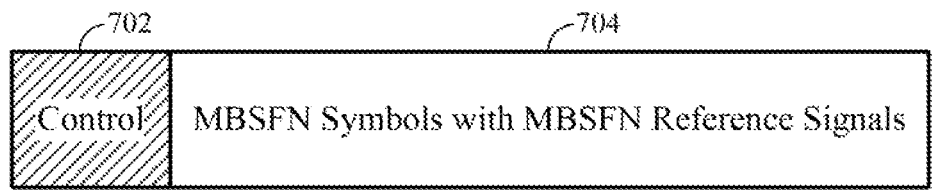
FIG. 7 illustrates a conventional MBSFN subframe structure.

FIG. 7 illustrates a conventional MBSFN subframe structure, which includes a control region 702 and a data region 704. The data region 704 may carry traffic (e.g., MBSFN symbols) and MBSFN reference signals.

Figure 8:
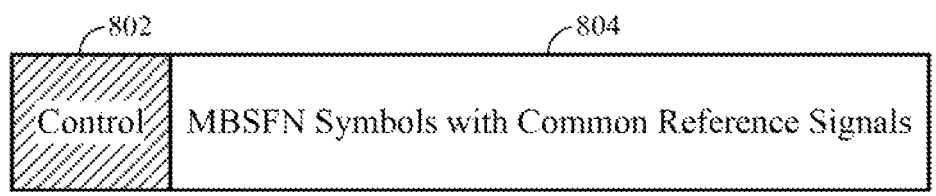
FIG. 8 illustrates a MBSFN subframe structure when used for unicast transmission or traffic, in accordance with certain aspects of the present disclosure.

FIG. 8 illustrates a MBSFN subframe structure when used for unicast transmission or traffic, in accordance with certain aspects of the present disclosure. As illustrated, the subframe may include a control region 802 and a data region 804. When MBSFN subframes are used for unicast transmission or traffic, it may be assumed that the entire data region 804 is converted to a data region of a regular unicast subframe, which may carry a common RS (CRS). Inclusion of the CRS in the MBSFN symbols, as illustrated in FIG. 8, may not be necessary, however, it may impact future technologies such as relaying backhaul, where dedicated RS or UE-specific RS (e.g., UE-RS) may be preferred. Therefore, a pattern for the RS signals in the MBSFN subframes is proposed as illustrated in FIG. 9.

Figure 9:
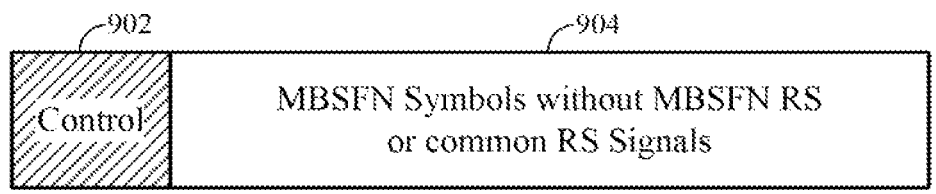
FIG. 9 illustrates a proposed MBSFN subframe structure for unicast transmission or traffic, in accordance with certain aspects of the present disclosure.

FIG. 9 illustrates a proposed MBSFN subframe structure when used for unicast transmission or traffic, in accordance with certain aspects of the present disclosure. As illustrated, the proposed subframe structure may include a control region 902 and a data region 904. The data region 904 may not include any MBSFN RS or common RS signals. In the proposed structure, support for unicast traffic may be realized via UE-specific RSs. For example, each UE may receive a unicast message with RSs dedicated to the UE.

For certain aspects, a UE may identify the MBSFN subframes that are used for unicast transmission by processing the reference signals in the subframe. For example, if an MBSFN subframe is used for transmitting a MBSFN message, the subframe may be transmitted with MBSFN reference signals as illustrated in FIG. 7. On the other hand, if the MBSFN subframe is used for transmission of a unicast message, the subframe may not include MBSFN reference signals. Instead, the subframe may include UE-specific reference signals or common reference signal as illustrated in FIGS. 8 and 9 if used for unicast transmission.

The RS may also depend on the format of a Downlink Control Information (DCI) message. For example, DCI formats may include 0, 1A, 1B, 1C, 1D, 2, and 2A. Alternatively, for certain embodiments, the RS may depend on the Physical Downlink Control Channel (PDSCH) transmission scheme. For example, the PDSCH may use a transmit diversity scheme with a truncated CRS pattern for the Physical Downlink Shared Channel (PDSCH) scheduled by DCI format 1A. In a truncated CRS pattern, the CRS may only be transmitted within an assigned PDSCH bandwidth instead of the entire downlink bandwidth. For UE-RS based PDSCH transmissions, only UE-specific RS may be used. Therefore, a CRS may not be transmitted for the assigned PDSCH transmission.

In time division duplex (TDD) systems, two or more downlink subframes may be mapped to one uplink (UL) subframe in terms of hybrid automatic repeat request (HARQ) acknowledgment (ACK)/negative acknowledgement (NACK) feedback. A set of these subframes may be called downlink subframe bundling window, whose size may be represented by M.

Figure 10:
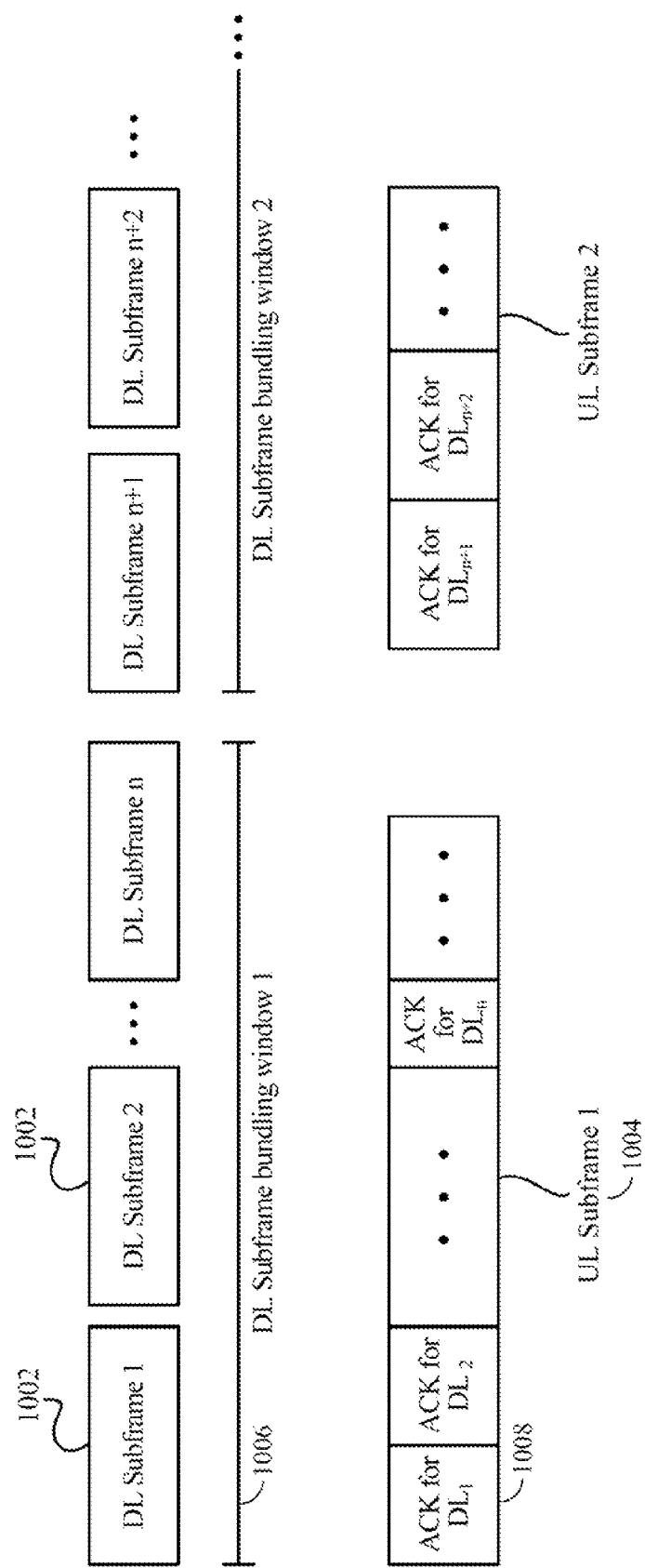
FIG. 10 illustrates a downlink subframe bundling window in a TDD system.

FIG. 10 illustrates a downlink subframe bundling window in a TDD system. As illustrated, an uplink subframe 1004 may carry ACK messages 1008 (or NACK messages though not shown in FIG. 10) corresponding to one or more DL subframes 1002 that are in a common DL subframe bundling window 1006. The DL subframes 1, . . . , n correspond to the DL subframe bundling window 1 and the DL subframes n+1, n+2, . . . correspond to the DL subframe bundling window 2. An uplink subframe (e.g., UL subframe 1) may carry the ACK/NACK messages for all the DL subframes in a DL subframe bundling window 1006 (e.g., DL subframe bundling window 1).

To support HARQ feedback for M subframes in one UL subframe, a UE may be configured to operate in either bundling or multiplexing mode. In the bundling mode, up to two bits, which correspond two codewords, may be transmitted back to the access point. Each bit may represent a logical AND operation per codeword across M downlink (DL) subframes associated with a single UL subframe 1004. Generation of the acknowledgement message in either bundling or multiplexing mode may be performed by the acknowledgement generating component 436 in FIG. 4.

In the multiplexing mode, up to four bits, which may represent up to M=4 subframes, may be transmitted back to the access point. Each bit may represent spatial ACK/NACK bundling across multiple codewords within a DL subframe. Each bit may be generated by performing a logical AND operation on all the corresponding individual ACK/NACKs. It should be noted that these M subframes may be consecutive downlink subframes, but, may not be consecutive in time. One or more UL subframes may be transmitted between each two DL subframes.

If MBSFN subframes are not used for unicast, there may not be a need to transmit ACK/NACK for these subframes. Therefore, for certain aspects, M may be defined as follows: $M \geq M_{Non-MBSFN}$, where $M_{Non-MBSFN}$ represents the unicast subframes (e.g., non-MBSFN subframes).

For certain aspects, when MBSFN subframes are used for unicast, these MBSFN subframes may be counted as part of the subframe bundling window. UEs may need to be informed of such information in order to be able to determine the subframe bundling window correctly. For example, layer 2 (e.g., Medium Access Control (MAC) and Radio Link Control (RLC)) or layer 3 (e.g., Radio Resource Control (RRC)) of a protocol stack may be used to signal the information. If reuse of MBSFN subframes for unicast is activated in a dynamic manner, the UE may assume a fixed subframe bundling window, which could be equal to or less than M.

For certain aspects, a similar design philosophy may be applied to multi-carrier operation. It may be possible that multiple DL carriers may rely on HARQ feedback from one UL carrier. Therefore, if some of the carriers are configured for MBSFN, the equivalent carrier bundling window, which may be on multiple carriers but the same subframe, may rely on one HARQ feedback message. If multiple carriers and/or multiple subframes rely on a single HARQ feedback message, a bundling window may semi-statically or dynamically be generated/updated to account for the number of the subframes configured for MBSFN.

Several design aspects were discussed in the present disclosure to facilitate utilizing unused MBSFN subframes for unicast transmissions, such as utilizing an efficient CP design, a new MBSFN structure when the MBSFN subframe is used for unicast, and an optimized subframe/carrier bundling window for HARQ feedback in the presence of MBSFN subframes.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in figures, those operations may have corresponding counterpart means-plus-function components with similar numbering.

Figure 5A:
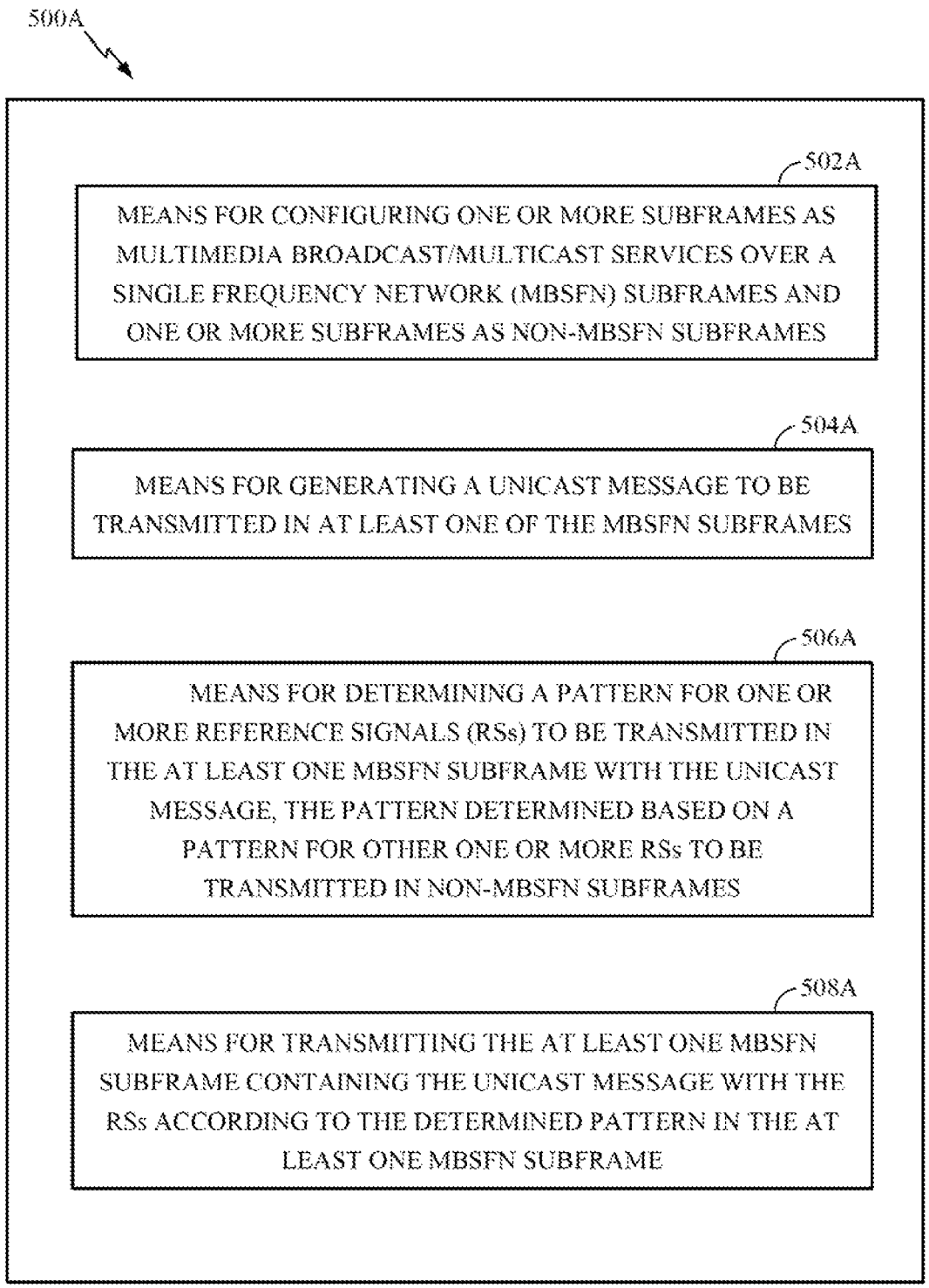
FIG. 5A illustrates example components capable of performing the operations illustrated in FIG. 5.

For example, operations 500 illustrated in FIG. 5 correspond to means 500A illustrated in FIG. 5A. The means for configuring one or more subframes 502A may comprise any suitable type of configuring component, such as the MBSFN/non-MBSFN subframe configuring component 422 of the access point 420 illustrated in FIG. 4. The means for generating a unicast message 504A may comprise any suitable type of generating component, such as the unicast message generating component 424 of the access point 420 illustrated in FIG. 4. The means for determining a pattern 506A may comprise any suitable type of determining component, such as the pattern determining component 426 of the access point 420 illustrated in FIG. 4. These components may be implemented with any suitable components, such as one or more processors, for example, such as the TX data processor 214 and/or processor 230 of the transmitter system 210 illustrated in FIG. 2. The means for transmitting 508A may comprise a suitable transmitting component such as the MBSFN subframe transmitting component 428 of the access point 420 shown in FIG. 4.

Figure 6A:
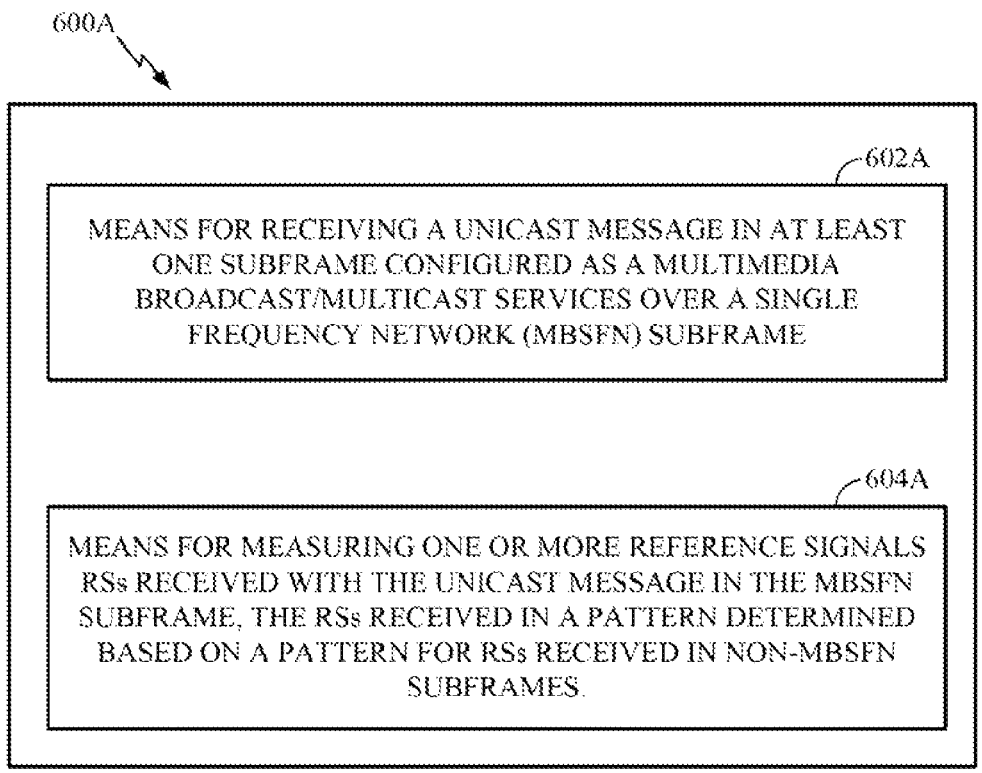
FIG. 6A illustrates example components capable of performing the operations illustrated in FIG. 6.

Similarly, operations 600 illustrated in FIG. 6 correspond to means 600A illustrated in FIG. 6A. The means for receiving a unicast message 602A may comprise any suitable receiving component, such as the MBSFN subframe receiving component 432 of the user equipment 430 shown in FIG. 4. The means for measuring one or more reference signals 604A may comprise any suitable measuring component, such as the RS measuring component 434 of the user equipment 430 shown in FIG. 4. These components may be implemented with any suitable components, such as one or more processors, for example, such as the RX data processor and/or processor 270 of the receiver system 250 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
    configuring one or more subframes of a frame as Multimedia Broadcast/Multicast Services over a Single Frequency Network (MBSFN) subframes and one or more subframes as non-MBSFN subframes;
    generating a unicast message to be transmitted in at least one of the MBSFN subframes;
    determining a pattern for one or more reference signals (RSs) to be transmitted in the at least one MBSFN subframe with the unicast message, the pattern determined based on a transmission scheme of a channel, wherein the one or more RSs comprise user equipment (UE) specific RSs (UE-RSs);
    transmitting the at least one MBSFN subframe containing the unicast message with the RSs according to the determined pattern in the at least one MBSFN subframe, and wherein a data region of the at least one MBSFN subframe does not contain any MBSFN RS or common reference signals (CRS).

2. The method of claim 1, wherein the transmission scheme comprises a physical downlink shared channel (PDSCH) transmission scheme.

3. The method of claim 2, wherein the PDSCH transmission scheme comprises a UE-RS-based PDSCH transmission scheme.

4. The method of claim 1, further comprising: receiving a hybrid automatic repeat request (HARQ) acknowledgement in response to the at least one MBSFN subframe.

5. The method of claim 1, further comprising: receiving at least one hybrid automatic repeat request (HARQ) acknowledgement in an uplink subframe, wherein the uplink subframe provides HARQ feedback for a plurality of downlink (DL) subframes, and wherein at least one of the downlink subframes is a MBSFN subframe.

6. The method of claim 5, wherein the HARQ acknowledgement is not received in the uplink subframe if the at least one MBSFN subframe does not support unicast transmission.

7. The method of claim 5, wherein each of the plurality of downlink subframes are transmitted on different subcarriers.

8. The method of claim 5, further comprising: signaling one or more UEs with information indicative of a number of MBSFN subframes that support unicast transmissions.

9. The method of claim 1, wherein a single type of cyclic prefix is used in an entire MBSFN subframe of the at least one MBSFN subframe.

10. A method for wireless communications, comprising:
    receiving a unicast message in at least one subframe of a frame, the at least one subframe configured as a Multimedia Broadcast/Multicast Services over a Single Frequency Network (MBSFN) subframe;
    measuring one or more reference signals (RSs) received with the unicast message in the at least one MBSFN subframe, the RSs received in a pattern determined based on a transmission scheme of a channel, wherein the one or more RSs comprise user equipment (UE) specific RSs (UE-RSs), and a data region of the at least one MBSFN subframe does not contain any MBSFN RS or common reference signals (CRS).

11. The method of claim 10, further comprising: transmitting an acknowledgement of one or more non-MBSFN subframes.

12. The method of claim 10, further comprising: transmitting a hybrid automatic repeat request (HARQ) acknowledgement in an uplink subframe after receiving the unicast message in the at least one MBSFN subframe.

13. The method of claim 10, further comprising: transmitting at least one hybrid automatic repeat request (HARQ) acknowledgement in an uplink subframe, wherein the uplink subframe provides HARQ feedback for a plurality of downlink (DL) subframes, and wherein at least one of the DL subframes is a MBSFN subframe.

14. The method of claim 13, wherein the HARQ acknowledgement is not transmitted in the uplink subframe if the at least one MBSFN subframe does not carry the unicast message.

15. The method of claim 13, wherein each of the plurality of downlink (DL) subframes are received on different subcarriers.

16. The method of claim 10, wherein a single type of cyclic prefix is used in an entire MBSFN subframe of the at least one MBSFN subframe.

17. An apparatus for wireless communications, comprising:
    means for configuring one or more subframes of a frame as Multimedia Broadcast/Multicast Services over a Single Frequency Network (MBSFN) subframes and one or more subframes as non-MBSFN subframes;
    means for generating a unicast message to be transmitted in at least one of the one or more MBSFN subframes;
    means for determining a pattern for one or more reference signals (RSs) to be transmitted in the at least one MBSFN subframe with the unicast message, the pattern determined based on a transmission scheme of a channel, wherein the one or more RSs comprise user equipment (UE) specific RSs (UE-RSs); and
    means for transmitting the at least one MBSFN subframe containing the unicast message with the RSs according to the determined pattern in the at least one MBSFN subframe, wherein a data region of the at least one MBSFN subframe does not contain any MBSFN RS or common reference signals (CRS).

18. The apparatus of claim 17, wherein the transmission scheme comprises on a physical downlink shared channel (PDSCH) transmission scheme.

19. The apparatus of claim 18, wherein the PDSCH transmission scheme comprises a UE-RS-based PDSCH transmission scheme.

20. The apparatus of claim 17, further comprising:
    means for receiving a hybrid automatic repeat request (HARQ) acknowledgement in response to the at least one MBSFN subframe.

21. The apparatus of claim 17, further comprising: means for receiving at least one hybrid automatic repeat request (HARQ) acknowledgement in an uplink 3subframe, wherein the uplink subframe provides HARQ feedback for a plurality of downlink (DL) subframes, and wherein at least one of the downlink subframes is a MBSFN subframe.

22. The apparatus of claim 21, wherein the HARQ acknowledgement is not received in the uplink subframe if the at least one MBSFN subframe does not support unicast transmission.

23. The apparatus of claim 21, wherein each of the plurality of downlink subframes are transmitted on different subcarriers.

24. The apparatus of claim 21, further comprising: means for signaling one or more user equipments (UEs) with information indicative of a number of MBSFN subframes that support unicast transmissions.

25. The apparatus of claim 17, wherein a single type of cyclic prefix is used in an entire MBSFN subframe of the at least one MBSFN subframe.

26. An apparatus for wireless communications, comprising:
    means for receiving a unicast message in at least one subframe configured as a Multimedia Broadcast/Multicast Services over a Single Frequency Network (MBSFN) subframe; and
    means for measuring one or more reference signals (RSs) received with the unicast message in the at least one MBSFN subframe, the RSs received in a pattern determined based on a transmission scheme of a channel, wherein the one or more RSs comprise user equipment (UE) specific RSs (UE-RSs), and a data region of the at least one MBSFN subframe does not contain any MBSFN RS or common reference signals (CRS).

27. The apparatus of claim 26, further comprising: means for transmitting an acknowledgement of one or more non-MBSFN subframes.

28. The apparatus of claim 26, further comprising: means for transmitting a hybrid automatic repeat request (HARQ) acknowledgement in an uplink subframe after the unicast message is received in the at least one MBSFN subframe.

29. The apparatus of claim 26, further comprising: means for transmitting at least one hybrid automatic repeat request (HARQ) acknowledgement in an uplink subframe, wherein the uplink subframe provides HARQ feedback for a plurality of downlink (DL) subframes, and wherein at least one of the DL subframes is a MBSFN subframe.

30. The apparatus of claim 29, wherein the HARQ acknowledgement is not transmitted in the uplink subframe if the at least one MBSFN subframe does not carry the unicast message.

31. The apparatus of claim 29, wherein each of the plurality of downlink (DL) subframes are received on different subcarriers.

32. The apparatus of claim 26, wherein a single type of cyclic prefix is used in an entire MBSFN subframe of the at least one MBSFN subframe.

33. An apparatus for wireless communications, comprising:
    at least one processor configured to:
    configure one or more subframes of a frame as Multimedia Broadcast/Multicast Services over a Single Frequency Network (MBSFN) subframes and one or more subframes as non-MBSFN subframes,
    generate a unicast message to be transmitted in at least one of the one or more MBSFN subframes,
    determine a pattern for one or more reference signals (RSs) to be transmitted in the at least one MBSFN subframe with the unicast message,
    the pattern determined based on a transmission scheme of a channel, wherein the one or more RSs comprise user equipment (UE) specific RSs (UE-RSs),
    and transmit the at least one MBSFN subframe containing the unicast message with the RSs according to the determined pattern in the at least one MBSFN subframe, wherein a data region of the at least one MBSFN subframe does not contain any MBSFN RS or common reference signals (CRS);
and a memory coupled to the at least one processor.

34. The apparatus of claim 33, wherein a single type of cyclic prefix is used in an entire subframe for the at least one MBSFN subframe that is used for unicast transmission.

35. An apparatus for wireless communications, comprising:
at least one processor configured to:
receive a unicast message in at least one subframe configured as a Multimedia Broadcast/Multicast Services over a Single Frequency Network (MBSFN) subframe, and
measure one or more reference signals (RSs) received with the unicast message in the at least one MBSFN subframe, the RSs received in a pattern determined based on a transmission scheme of a channel,
wherein the one or more RSs comprise user equipment (UE) specific RSs (UE-RSs), and a data region of the at least one MBSFN subframe does not contain any MBSFN RS or common reference signals (CRS);
and a memory coupled to the at least one processor.

36. The apparatus of claim 35, wherein a single type of cyclic prefix is used in an entire subframe for the at least one MBSFN subframe that is used for unicast transmission.

37. A computer-program product for wireless communications, the computer-program product comprising:
a non-transitory computer-readable medium comprising code executable by a processor, the code for causing an apparatus to:
configure one or more subframes of a frame as Multimedia Broadcast/Multicast Services over a Single Frequency Network (MBSFN) subframes and one or more subframes as non-MBSFN subframes;
generate a unicast message to be transmitted in at least one of the one or more MBSFN subframes;
determine a pattern for one or more reference signals (RSs) to be transmitted in the at least one MBSFN subframe with the unicast message, the pattern determined based on a transmission scheme of a channel, wherein the one or more RSs comprise user equipment (UE) specific RSs (UE-RSs), and a data region of the at least one MBSFN subframe does not contain any MBSFN RS or common reference signals (CRS); and
transmit the at least one MBSFN subframe containing the unicast message with the RSs according to the determined pattern in the at least one MBSFN subframe.

38. The computer-program product of claim 37, wherein a single type of cyclic prefix is used in an entire subframe for the at least one MBSFN subframe that is used for unicast transmission.

39. A computer-program product for wireless communications, the computer-program product comprising a non-transitory computer-readable medium comprising code executable by a processor, the code for causing an apparatus to:
receive a unicast message in at least one subframe configured as a Multimedia Broadcast/Multicast Services over a Single Frequency Network (MBSFN) subframe; and
measure one or more reference signals (RSs) received with the unicast message in the at least one MBSFN subframe, the RSs received in a pattern determined based on a transmission scheme of a channel, wherein the one or more RSs comprise user equipment (UE) specific RSs (UE-RSs), and a data region of the at least one MBSFN subframe does not contain any MBSFN RS or common reference signals (CRS).

40. The computer-program product of claim 39, wherein a single type of cyclic prefix is used in an entire subframe for the at least one MBSFN subframe that is used for unicast transmission.

* * * * *